(12) United States Patent
Myers et al.

(10) Patent No.: US 7,195,399 B2
(45) Date of Patent: Mar. 27, 2007

(54) WHEELEND ASSEMBLY WITH DETACHABLE OUTBOARD JOINT

(75) Inventors: Douglas Charles Myers, Canton, MI (US); Hui Hugh Wang, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 551 days.

(21) Appl. No.: 10/692,969

(22) Filed: Oct. 24, 2003

(65) Prior Publication Data

US 2005/0088036 A1    Apr. 28, 2005

(51) Int. Cl.
*F16C 19/18*    (2006.01)
(52) U.S. Cl. .................. 384/544; 301/105.1; 384/559
(58) Field of Classification Search ............... 384/544, 384/559, 589; 301/105.1
See application file for complete search history.

(56) References Cited

U.S. PATENT DOCUMENTS

| | | |
|---|---|---|
| 1,966,826 A | 7/1934 | Miller |
| 4,004,838 A | 1/1977 | Savage |
| 4,340,317 A | 7/1982 | Heitmann et al. |
| 4,493,388 A | 1/1985 | Welschof et al. |
| 4,629,028 A | 12/1986 | Krude et al. |
| 5,486,053 A | 1/1996 | Beagley et al. |
| 5,536,075 A | 7/1996 | Bertetti |
| 5,549,514 A | 8/1996 | Welschof |
| 6,022,275 A | 2/2000 | Bertetti |
| 6,152,825 A | 11/2000 | Doell |
| 6,170,628 B1 | 1/2001 | Bigley |
| 6,193,419 B1 | 2/2001 | Krude et al. |
| 6,196,639 B1 | 3/2001 | Di Ponio et al. |
| 6,354,952 B1 | 3/2002 | Boulton et al. |
| 6,413,008 B1 | 7/2002 | Van Dest et al. |
| 6,450,585 B1 | 9/2002 | Kochsiek |
| 6,557,660 B2 * | 5/2003 | Averill et al. ............... 180/247 |
| 6,648,518 B2 * | 11/2003 | Uchman ..................... 384/544 |
| 2002/0044706 A1 | 4/2002 | Kayama et al. |
| 2002/0106140 A1 | 8/2002 | Uchman |
| 2003/0044099 A1 | 3/2003 | Uchman |
| 2003/0063827 A1 * | 4/2003 | Webb et al. ................ 384/544 |

* cited by examiner

*Primary Examiner*—William C. Joyce
(74) *Attorney, Agent, or Firm*—Brinks Hofer Gilson & Lione

(57) ABSTRACT

A wheel end assembly includes a bearing shaft having an inboard end and an outboard end, a wheel hub mounted onto the outboard end of the bearing shaft, and a detachable outboard joint mounted onto the inboard end of the bearing shaft. A wheel bearing is mounted onto the bearing shaft between the inboard end and the outboard end. The inboard end of the bearing shaft includes a flange portion to support the wheel bearing on the bearing shaft and to induce a pre-load into the wheel bearing such that the pre-load is maintained on the wheel bearing when the outboard joint is removed from the wheel end assembly. A support hub is positioned between and interconnects the detachable outboard joint and the bearing shaft. The support hub has a shaft portion that engages the bearing shaft and an engagement portion extending axially from the shaft portion.

13 Claims, 5 Drawing Sheets

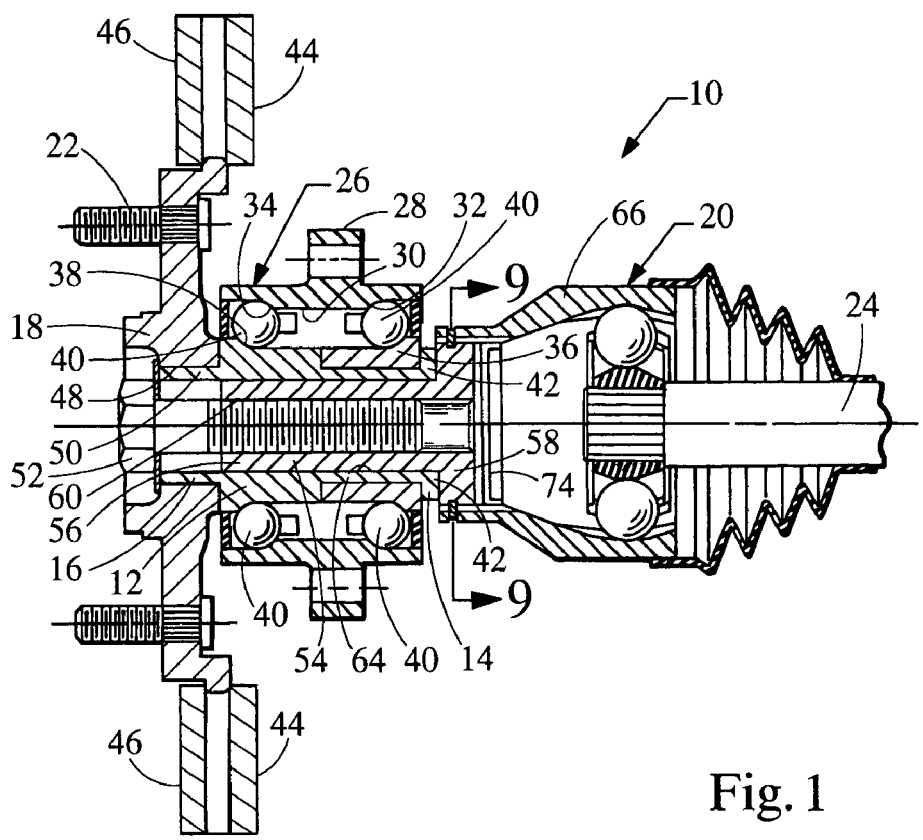
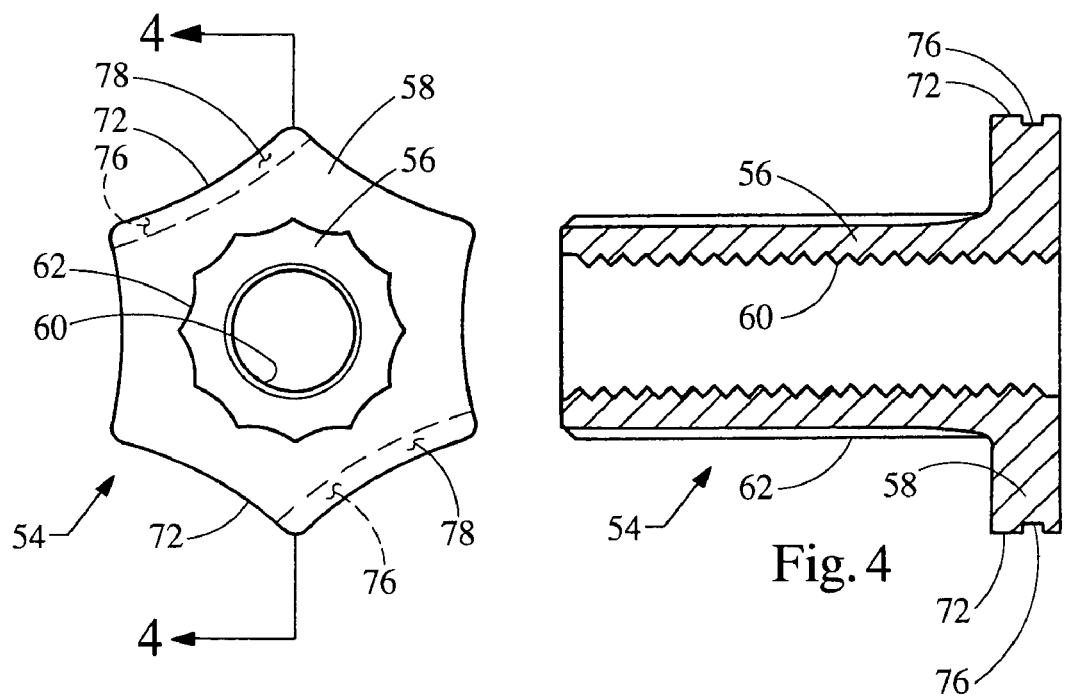
Fig. 1
Fig. 3
Fig. 4

WHEELEND ASSEMBLY WITH DETACHABLE OUTBOARD JOINT

FIELD OF INVENTION

The invention relates to a wheel end assembly for a motor vehicle that features a self retained, pre-loaded wheel bearing and a detachable outboard joint which can be removed from the wheel end assembly without allowing the wheel bearing to come apart.

BACKGROUND OF THE INVENTION

In current wheel end designs, an outboard joint includes a stem that is inserted into a hub to transmit rotational power across the wheel end assembly. In these designs, the wheel bearing is not self-retained. Therefore, if the outboard joint is removed from the wheel end assembly, the wheel bearing will fall apart. Additionally, these designs do not eliminate backlash, and therefore, the loads that they can transmit are limited.

Accordingly, there is a need for a wheel end assembly featuring a self retained wheel bearing and a detachable outboard joint, wherein the outboard joint can be removed from the wheel end assembly leaving the wheel bearing intact.

SUMMARY

In meeting the above need and in over coming the limitations of the known designs a wheel end assembly is provided having a bearing shaft with an inboard end and an outboard end. A wheel hub is mounted onto the outboard end and a detachable outboard joint is mounted onto the inboard end. Mounted onto the bearing shaft between the inboard end and the outboard end is a wheel bearing. The inboard end includes a flange portion that supports the wheel bearing on the bearing shaft and induces a pre-load into the wheel bearing such that the pre-load is maintained on the wheel bearing when the outboard joint is removed from the wheel end assembly. A support hub is rotationally locked to the bearing shaft and rotationally locked to the outboard joint to provide a connection therebetween.

In one aspect the wheel bearing includes a knuckle flange that is adapted to connect the wheel end assembly within a vehicle. The knuckle flange has an inner diameter that defines an inboard outer race and an outboard outer race. The bearing shaft supports an inboard inner race and an outboard inner race. A plurality of bearing elements are positioned between the knuckle flange and the bearing shaft with a first portion of the bearing elements being positioned between the inboard outer race and the inboard inner race and a second portion of the bearing elements being positioned between the outboard outer race and the outboard inner race. The flange portion of the bearing shaft engages the inboard inner race to support the wheel bearing and induces a pre-load into the wheel bearing.

In another aspect, the outboard joint includes a bell housing having a narrowed neck portion that defines a bell housing inner surface having a polygon shape. The support hub includes an outer surface at the inboard end having a polygon shape corresponding to the bell housing inner surface. The bell housing engages the support hub and rotationally locks the bell housing and the support hub to one another.

Additional features, benefits, and advantages will become apparent to those skilled in the art to which the invention relates, from a review of the subsequent description and the appended claims, taken in conjunction with the accompanying drawings.

BRIEF DESCRIPTION OF THE DRAWINGS

FIG. 1 is a side sectional view of a wheel end assembly;

FIG. 3 is an end view of a support hub of the present invention wherein an engagement portion of the support hub has a polygonal shape and a shaft portion of the support hub has a polygonal shaped outer surface;

FIG. 4 is sectional view taken along line 4—4 of FIG. 3;

DETAILED DESCRIPTION

Figure 2:
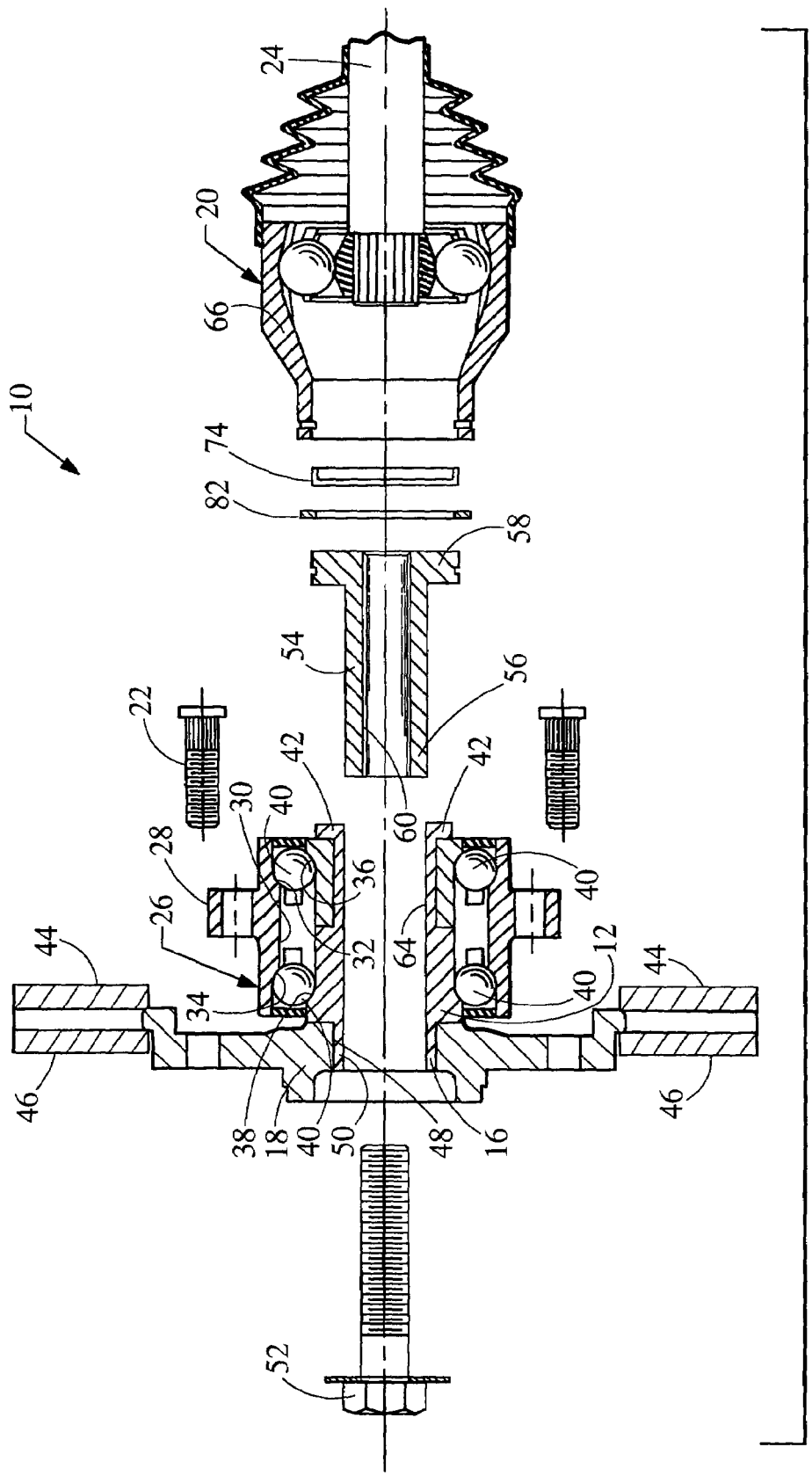
FIG. 2 is an exploded sectional view of the wheel end assembly shown in FIG. 1.

Referring to FIGS. 1 and 2, a wheel end assembly for a motor vehicle is shown generally at 10. The wheel end assembly 10 includes a bearing shaft 12 having an inboard end 14 and an outboard end 16. A wheel hub 18 is mounted to the outboard end 16 of the bearing shaft 12 and a detachable outboard joint 20 is mounted onto the inboard end 14 of the bearing shaft 12.

A plurality of wheel studs 22 extend from the wheel hub 18. The wheel studs 22 are adapted to engage a wheel (not shown) and support the wheel on the wheel hub 18. The outboard joint 20 connects an axle half shaft 24 to the wheel end assembly 10 such that rotational movement is transferred through the axle half shaft 24 to the wheel end assembly 10. The outboard joint 20 is a joint that is adapted to allow angular deflection between the wheel end assembly 10 and the axle half shaft 24, such as a constant velocity joint.

A wheel bearing 26 is mounted on the bearing shaft 12, between the inboard end 14 and the outboard end 16, to rotatably support the wheel end assembly 10 on the structure (not shown) of the vehicle. The wheel bearing 26 includes a knuckle flange 28 that is adapted to connect the wheel end assembly 10 to the structure (not shown) of the vehicle. The knuckle flange 28 has an inner diameter 30 that defines an inboard outer race 32 and an outboard outer race 34.

Figure 13:
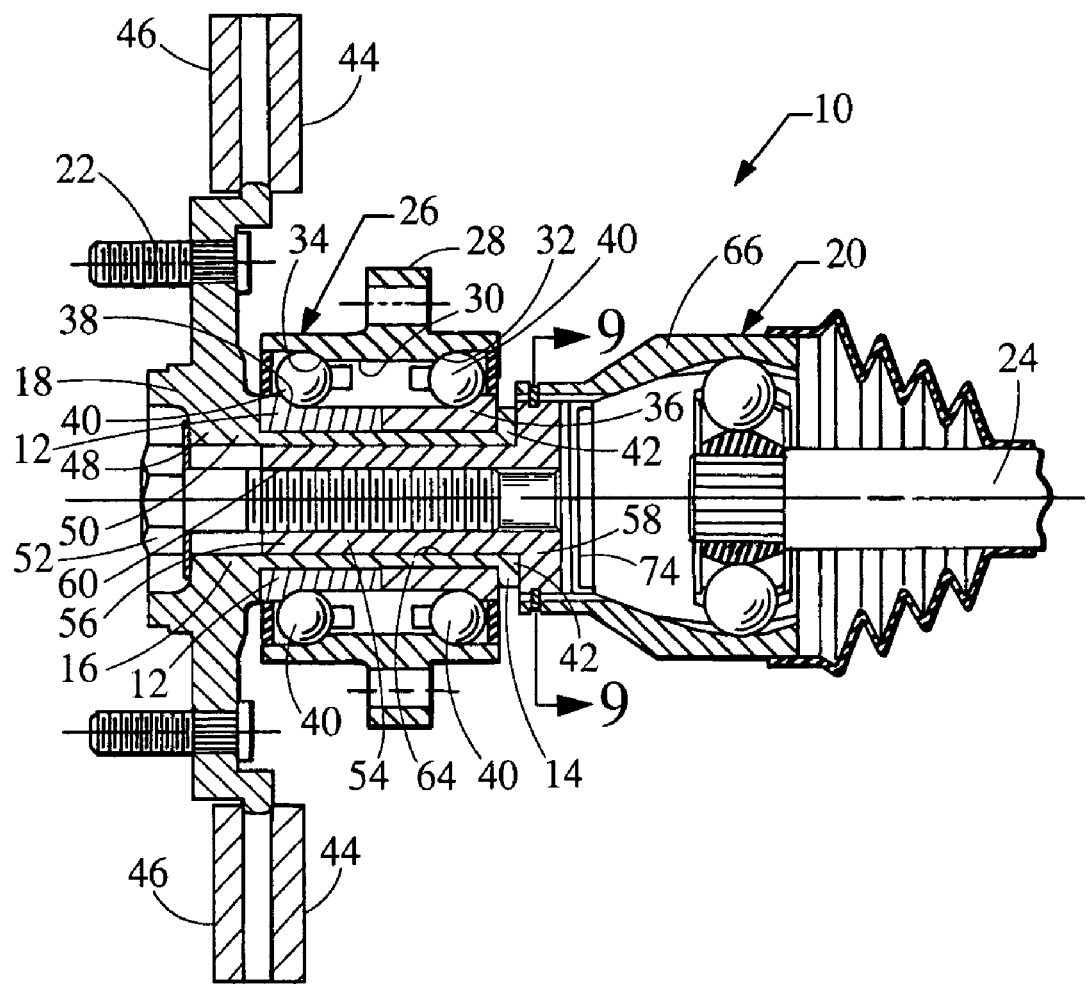
FIG. 13 is a side sectional view of an alternate embodiment of the wheel end assembly.

The bearing shaft 12 supports an inboard inner race 36 and an outboard inner race 38. A shown in FIGS. 1 and 2, the inboard inner race 36 is a separate component mounted onto the bearing shaft 12 and the outboard inner race 38 is integrally formed within the bearing shaft 12. Alternatively, the outboard inner race 38 can also be a separate component mounted onto the bearing shaft 12, as shown in FIG. 13.

A plurality of bearing elements 40 are positioned within the wheel bearing 26. A first portion of the bearing elements 40 are positioned between the inboard outer race 32 and the inboard inner race 36 and a second portion of the bearing elements 40 are positioned between the outboard outer race 34 and the outboard inner race 38. The bearing elements 40 allow the bearing shaft 12 to rotate relative to the knuckle flange 28, thereby rotatably supporting the wheel end assembly 10 within the vehicle. The bearing elements 40 can be ball bearings, tapered bearings, or other suitable bearing elements, depending on the particular application.

The inboard end 14 of the bearing shaft 12 includes a flange portion 42. The flange portion 42 engages the inboard inner race 36 to provide a support for the wheel bearing 26 thereby keeping the wheel bearing 26 positioned on the bearing shaft 12 and inducing a pre-load into the wheel bearing 26. The flange portion 42 is formed by swaging a portion of the bearing shaft 12 over and against the wheel bearing 26. The flange portion 42 maintains a pre-load on the wheel bearing 26 when the outboard joint 20 is removed from the wheel end assembly 10.

As shown in FIGS. 1 and 2, the wheel hub 18 includes a brake rotor 44 having a braking ring 46 mounted thereon. As illustrated, the braking ring 46 and the brake rotor 44 are integrally formed with one another.

The wheel hub 18 includes a polygonal shaped inner bore 48 and the outboard end 16 of the bearing shaft 12 includes a correspondingly shaped polygonal hub 50 extending therefrom. The polygonal hub 50 of the bearing shaft 12 fits within the polygonal shaped bore 48 of the wheel hub 18 to rotationally lock the wheel hub 18 to the bearing shaft 12. A threaded fastener 52 axially secures the wheel hub 18 to the bearing shaft 12. Alternatively, the wheel hub 18 and the bearing shaft 12 can be integrally formed with one another as a single component, as shown in FIG. 13.

A support hub 54 is positioned between and interconnects the bearing shaft 12 to the outboard joint 20. Referring to FIGS. 3 and 4, the support hub 54 includes a shaft portion 56 and an engagement portion 58. The shaft portion 56 engages the bearing shaft 12 to rotationally lock the support hub 54 to the bearing shaft 12. The support hub 54 is secured to the bearing shaft 12 by a threaded fastener 52 that extends into the outboard end of the bearing shaft 12 and engages a threaded inner diameter 60 of the shaft portion 56 of the support hub 54. The threaded fastener 52 can be the same threaded fastener 52 that secures the wheel hub 18 to the bearing shaft 12, or in the instance where the wheel hub 18 and the bearing shaft 12 are integrally formed, the threaded fastener 52 only serves to secure the support hub 54 within the bearing shaft 12.

Since the support hub 54 engages the bearing shaft 12 distal to the wheel bearing 26, the support hub 54 can be removed from the wheel end assembly 10 without removing the support for the wheel bearing 26. Thus making repair and replacement of components simple.

Figure 5:
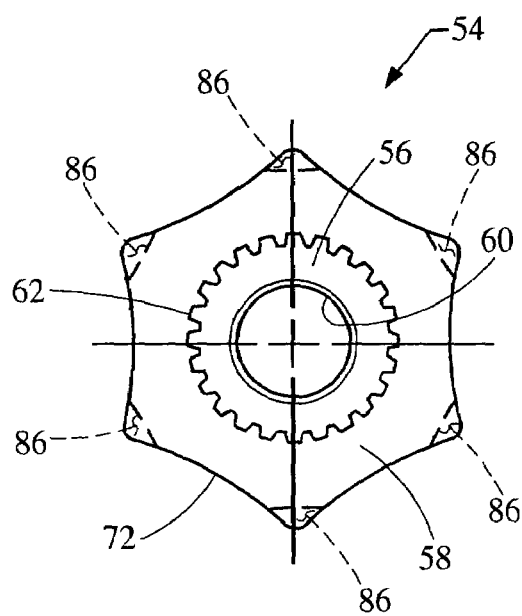
FIG. 5 is an end view of a support hub having a polygonal shaped engagement portion and a shaft portion having teeth extending therefrom.
Figure 6:
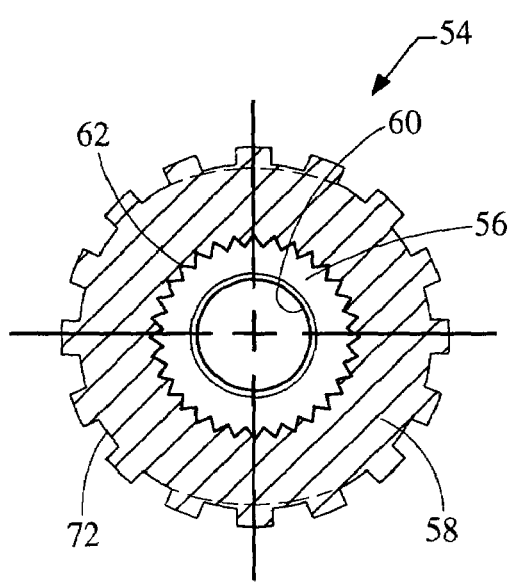
FIG. 6 is an end view of a support hub having an engagement portion with teeth extending therefrom and a shaft portion have a splined outer surface.

Referring to FIG. 3, an outer surface 62 of the shaft portion 56 of the support hub 54 is polygonal shaped and engages a correspondingly shaped inner surface 64 of the bearing shaft 12 to rotationally lock the support hub 54 to the bearing shaft 12. Alternatively, the outer surface 62 of the shaft portion 56 of the support hub 54 can include teeth that engage corresponding teeth on the inner surface 64 of the bearing shaft 12, as shown in FIG. 5, or a spline that engages the inner surface 64 of the bearing shaft 12 as shown in FIG. 6.

The outboard joint 20 includes a bell housing 66 having a narrowed neck portion 68 defining a bell housing inner surface 70. The bell housing inner surface 70 engages an outer surface 72 of the engagement portion 58 of the support hub 54 to rotationally lock the bell housing 66 to the support hub 54. As shown in FIG. 3, the outer surface 72 of the engagement portion 58 of the support hub 54 can be polygonal shaped and engage a correspondingly shaped inner surface 70 of the bell housing 66. Alternatively, the outer surface 72 of the engagement portion 58 of the support hub 54 can have teeth extending therefrom that engage corresponding teeth extending from the inner surface 70 of the bell housing 66, as shown in FIG. 6. In either instance, the bell housing inner surface 70 engages the outer surface 72 of the support hub 54 and is rotationally locked to the support hub 54 and thereby to the bearing shaft 12. A seal 74 prevents contamination from entering the constant velocity joint.

Figure 7:
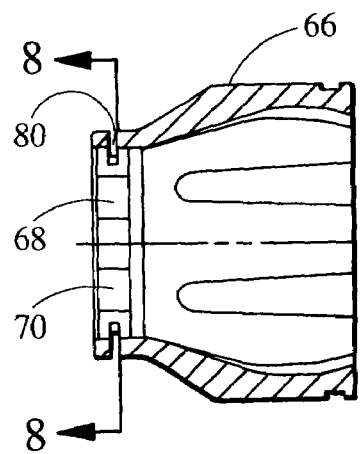
FIG. 7 is a side sectional view of a bell housing of the wheel end assembly, wherein the bell housing includes a pair of windows for insertion of a clip.
Figure 8:
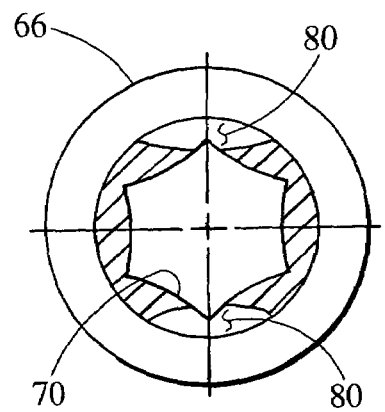
FIG. 8 is a sectional view taken along line 8—8 of FIG. 7.
Figure 9:
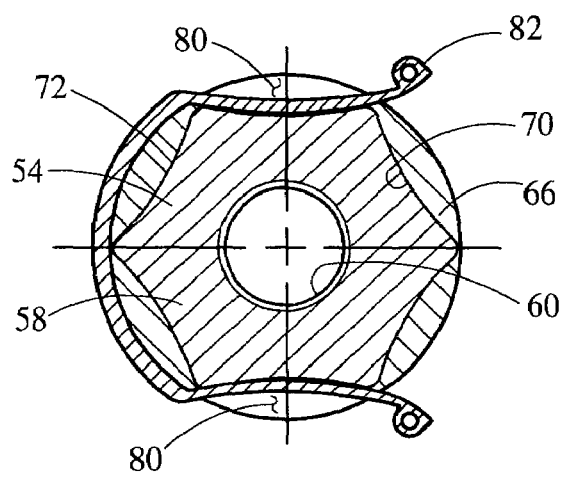
FIG. 9 is a sectional view taken along line 9—9 of FIG. 1.

Referring to FIG. 3, a notch 76 extends circumferentially around a portion of the outer surface 72 of the engagement portion 58 of the support hub 54. As shown, the notch 76 includes two curved grooves 78 cut into the outer surface 72 and located approximately one hundred and eighty degrees apart. Referring to FIGS. 7 and 8, the bell housing 66 includes at least one window 80 formed within the narrowed neck portion 68. As shown, the bell housing 66 includes two curved windows 80 located approximately one hundred and eighty degrees apart and corresponding to the curved grooves 78. A retaining clip 82 is inserted through the windows 80 and engages the grooves 78 to secure the bell housing 66 to the support hub 54, as shown in FIG. 9. To remove the bell housing 66 from the support hub 54 the retaining clip 82 must be removed.

Figure 10:
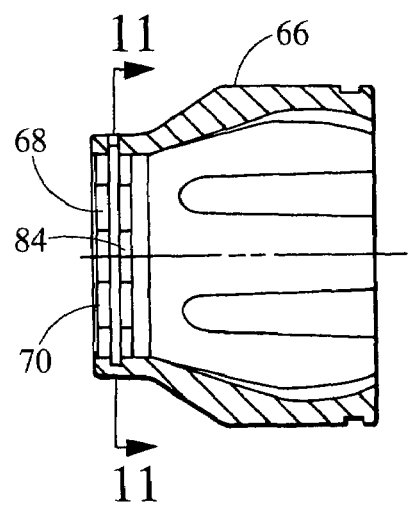
FIG. 10 is a side sectional view of a bell housing of the wheel end assembly, wherein the bell housing includes a groove formed therein for receiving a retaining ring.
Figure 11:
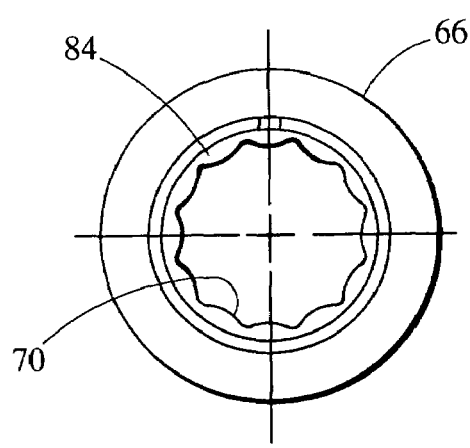
FIG. 11 is sectional view taken along line 11—11 of FIG. 10.
Figure 12:
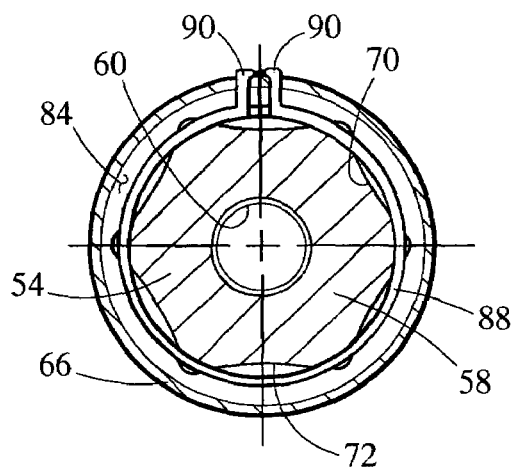
FIG. 12 is a sectional view similar to FIG. 9 of a wheel end assembly incorporating the bell housing and retaining ring shown in FIGS. 10 and 11.

Alternatively, the bell housing 66 can include a groove 84 extending around the bell housing inner surface 70, as shown in FIGS. 10 and 11. The outer surface 72 of the support hub 54 includes a groove 86 extending around the support hub 54, as shown in FIG. 5. A retaining ring 88 is positioned within the groove 84 within the bell housing 66 and engages the groove 86 of the support hub 54 to secure the bell housing 66 to the support hub 54, as shown in FIG. 12. To remove the bell housing 66 from the support hub 54, tangs 90 on the retaining ring 88 must be spread apart, such that the retaining ring 88 opens to a diameter larger than the groove 86 of the support hub 54. This allows the retaining ring 88 to clear the groove 86 so the bell housing 66 can be removed.

Additionally, the bell housing inner surface 70 and the outer surface 72 of the engagement portion 58 of the support hub 54 may be tapered at an angle along a longitudinal axis of the wheel end assembly 10. A tapered connection between the bell housing 66 and the support hub 54 allows for a secure connection and reduces backlash between the two components.

The foregoing discussion discloses and describes the preferred embodiments of the invention. These embodiments have been described in an illustrative manner, and it is to be understood that the terminology which has been used is intended to be in the nature of words of description rather than of limitation. One skilled in the art will readily recognize from such discussion, and from the accompanying drawings and claims, that changes and modifications can be made without departing from the scope of the invention as defined in the following claims.

We claim:

1. A wheel end assembly comprising:
   a bearing shaft having an inboard end and an outboard end;
   a wheel hub mounted onto said outboard end of said bearing shaft;
   a detachable outboard joint mounted onto said inboard end of said bearing shaft;
   a wheel bearing mounted onto said bearing shaft between said inboard end and said outboard end;
   said inboard end of said bearing shaft including a flange portion, said flange portion providing a support to keep said wheel bearing positioned onto said bearing shaft and to induce a pre-load into said wheel bearing such that said pre-load is maintained on said wheel bearing when said outboard joint is removed from said wheel end assembly; and
   a support hub positioned between and interconnecting said detachable outboard joint and said bearing shaft, said support hub having a shaft portion engaging said bearing shaft on an inner diameter of said bearing shaft and an engagement portion extending axially from said shaft portion; wherein,
   said engagement portion being attached to said outboard joint so as to prevent axial movement between said engagement portion and said outboard joint.

2. The wheel end assembly of claim 1 wherein said wheel bearing comprises:
   a knuckle flange adapted to connect said wheel end assembly to a vehicle, said knuckle flange having an inner diameter that defines an inboard outer race and an outboard outer race;
   an inboard inner race and an outboard inner race supported on said bearing shaft; and
   a plurality of bearing elements, a first portion of said bearing elements being positioned between said inboard outer race and said inboard inner race and a second portion of said bearing elements being positioned between said outboard outer race and said outboard inner race;
   said flange portion of said bearing shaft engaging said inboard inner race to support said wheel bearing and to induce a pre-load into said wheel bearing.

3. The wheel end assembly of claim 1 wherein said wheel bearing comprises:
   a knuckle flange adapted to connect said wheel end assembly to a vehicle, said knuckle flange having an inner diameter that defines an inboard outer race and an outboard outer race;
   an inboard inner race supported on said bearing shaft;
   an outboard inner race integrally formed within said bearing shaft; and
   a plurality of bearing elements, a first portion of said bearing elements being positioned between said inboard outer race and said inboard inner race and a second portion of said bearing elements being positioned between said outboard outer race and said outboard inner race;
   said flange portion of said bearing shaft engaging said inboard inner race to support said wheel bearing and to induce a re-load into said wheel bearing.

4. The wheel end assembly of claim 1 wherein said wheel hub includes a brake rotor having a braking ring, said braking ring and said brake rotor being integrally formed with one another.

5. The wheel end assembly of claim 1 wherein said wheel hub and said bearing shaft are integrally formed with one another.

6. The wheel end assembly of claim 1 wherein said outboard joint includes a bell housing, said bell housing having a narrowed neck portion defining a bell housing inner surface, said bell housing inner surface having a polygon shape, said engagement portion of said support hub including an outer surface having a polygon shape corresponding to said polygon shaped bell housing inner surface such that said bell housing engages said engagement portion of said support hub and rotationally locks said bell housing and said support hub to one another.

7. The wheel end assembly of claim 6 wherein said outer surface of said engagement portion of said support hub has outwardly extending teeth and said inner surface of said neck portion of said bell housing has inwardly extending teeth that engage said outwardly extending teeth of said support hub to rotationally lock said bell housing to said support hub.

8. The wheel end assembly of claim 6 wherein a notch extends circumferentially around a portion of said outer surface of said engagement portion of said support hub and said bell housing includes at least one window formed within said narrowed neck portion, said wheel end assembly further including a retaining clip inserted through said at least one window and engaging said notch of said support hub to secure said bell housing to said support hub.

9. The wheel end assembly of claim 6 wherein a notch extends circumferentially around a portion of said outer surface of said engagement portion of said support hub and a groove extends around said bell housing inner surface, said wheel end assembly further including a retaining ring positioned within said groove within said bell housing, said retaining ring engaging said groove and said notch of said support hub to secure said bell housing to said support hub.

10. The wheel end assembly of claim 1 wherein said shaft portion of said support hub includes a splined outer surface that engages an inner surface of said bearing shaft to rotationally lock said support hub to said bearing shaft.

11. The wheel end assembly of claim 1 wherein said shaft portion of said support hub includes an outer surface having outwardly extending teeth and said bearing shaft includes an inner surface with inwardly extending teeth that engage said outwardly extending teeth of said support hub to rotationally lock said support hub to said bearing shaft.

12. The wheel end assembly of claim 1 wherein said shaft portion of said support hub includes a polygon shaped outer surface and said bearing shaft includes a polygon shaped inner surface corresponding to said polygon shaped outer surface of said support hub such that said support hub is rotationally locked to said bearing shaft.

13. A wheel end assembly comprising:
   a bearing shaft having an inboard end and an outboard end;
   a wheel hub mounted onto said outboard end of said bearing shaft;
   a detachable outboard joint mounted onto said inboard end of said bearing shaft;
   a wheel bearing mounted onto said bearing shaft between said inboard end and said outboard end;
   said inboard end of said bearing shaft including a flange portion, said flange portion providing a support to keep said wheel bearing positioned onto said bearing shaft and to induce a pre-load into said wheel bearing such that said pre-load is maintained on said wheel bearing when said outboard joint is removed from said wheel end assembly; and a support hub positioned between and interconnecting said detachable outboard joint and said bearing shaft, said support hub having a shaft portion engaging said bearing shaft and an engagement portion extending axially from said shaft portion; wherein said shaft portion of said support hub includes a threaded inner diameter, said wheel end assembly including a threaded fastener engaging said threaded inner diameter of said support hub to secure said support hub to said bearing shaft.

* * * * *